(12) United States Patent
Illmann

(10) Patent No.: US 8,161,486 B2
(45) Date of Patent: Apr. 17, 2012

(54) DYNAMIC CONTROL OF COMPUTER RESOURCES FOR THE PIPELINE PROCESSING OF DATA USING ANYTIME ALGORITHMS

(75) Inventor: Joerg Illmann, Neu-Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 1967 days.

(21) Appl. No.: 11/033,506

(22) Filed: Jan. 12, 2005

(65) Prior Publication Data

US 2005/0188180 A1    Aug. 25, 2005

(30) Foreign Application Priority Data

Jan. 12, 2004  (DE) .................. 10 2004 001 680

(51) Int. Cl.
*G06F 9/46*   (2006.01)
(52) U.S. Cl. ........................................ 718/104
(58) Field of Classification Search ............ 718/104
See application file for complete search history.

(56) References Cited

U.S. PATENT DOCUMENTS

| | | | | |
|---|---|---|---|---|
| 5,255,359 A | * | 10/1993 | Ebbers et al. | 345/642 |
| 5,630,421 A | * | 5/1997 | Barlow et al. | 600/459 |
| 6,308,174 B1 | * | 10/2001 | Hayball et al. | 1/1 |
| 6,591,262 B1 | * | 7/2003 | MacLellan et al. | 1/1 |
| 2004/0267679 A1 | * | 12/2004 | Fromherz et al. | 706/19 |

OTHER PUBLICATIONS

Approximate Processing in Real-Time Problem Solving Lesser et al. AI Magazine vol. 9, No. 1, 1988.*
Approximate Reasoning Using Anytime Algorithms Zilberstein et al., 1995.*
Operational Rationality through Compilation of Anytime Algorithms Zilberstein et al., 1993.*
Becker, Wolfgang.; Globale dynamische Lastbalancierung in datenintensiven Anwendungen; Institut für Parallele und Verteilte Höchstleistungsrechner (IPVR) in der Abteilung Anwendersoftware (Prof. Dr. A. Reuter), Fakultät für Informatik, Univer. Stuttgart; 1993.; Institut für Parallele und Verteilte Höchstleistungsrechner (IPVR) in der Abteilung Anwendersoftware (Prof. Dr. A. Reuter), Fakultät für Informatik, Univer. Stuttgart; 1993.; Stuttgart; DE.
Bernstein, Daniel S.; Zilberstein, Shlomo; Perkins, Theodore; Finkelstein, Lev.; "Scheduling Contract Algorithms on Multiple Processors"; Using Uncertainty within Computation; AAAI 2001 Fall Symposium Nov. 2-4, 2001; Sea Crest Oceanfront Resort and Conference Center, North Falmouth, Cape Cod, MA, USA;; Cape Cod, MA, USA.
Thomas Dean, Decision-Theoretic Control of Inference for Time-Critical Applications; Technical Report No. CS-89-44, Revised Apr. 1990, Brown University, Dept. of Computer Science, Providence, Rhode Island 02912.

(Continued)

*Primary Examiner* — Meng An
*Assistant Examiner* — Mengyao Zhe
(74) *Attorney, Agent, or Firm* — Harness, Dickey & Pierce, P.L.C.

(57) ABSTRACT

Dynamic control of computer resources is used for processing process data in a pipeline. The pipeline includes a multiplicity of pipeline processors which each operate on the basis of an anytime approach and which can generate a result at a settable time. By detecting the runtime behavior of the pipeline processors involved using an ACTUAL value, it is possible to influence the resource allocation directly and at runtime without the need to interrupt the processing of the process data.

24 Claims, 2 Drawing Sheets

OTHER PUBLICATIONS

Eric A. Hansen et al., Monitoring and control of anytime algorithms: a dynamic programming approach; Artificial Intelligence, vol. 126, Issue 1-2. pp. 139-157, Feb. 1, 2001, Elsevier Science Publishers Ltd., ISSN:0004-3702; GB.

W. Becker, "Globale dynamische Lastbalancierung in datenintensiven Anwendungen" Fakultätsbericht Nr. 1993, Aug. 1, 1998.

D. Bernstein et al., "Scheduling Contract Algorithms on Multiple Processors" AAAI 2001 Fall Symposium, Nov. 2001.

German Office Action dated Dec. 21, 2004 and English translation of same.

\* cited by examiner

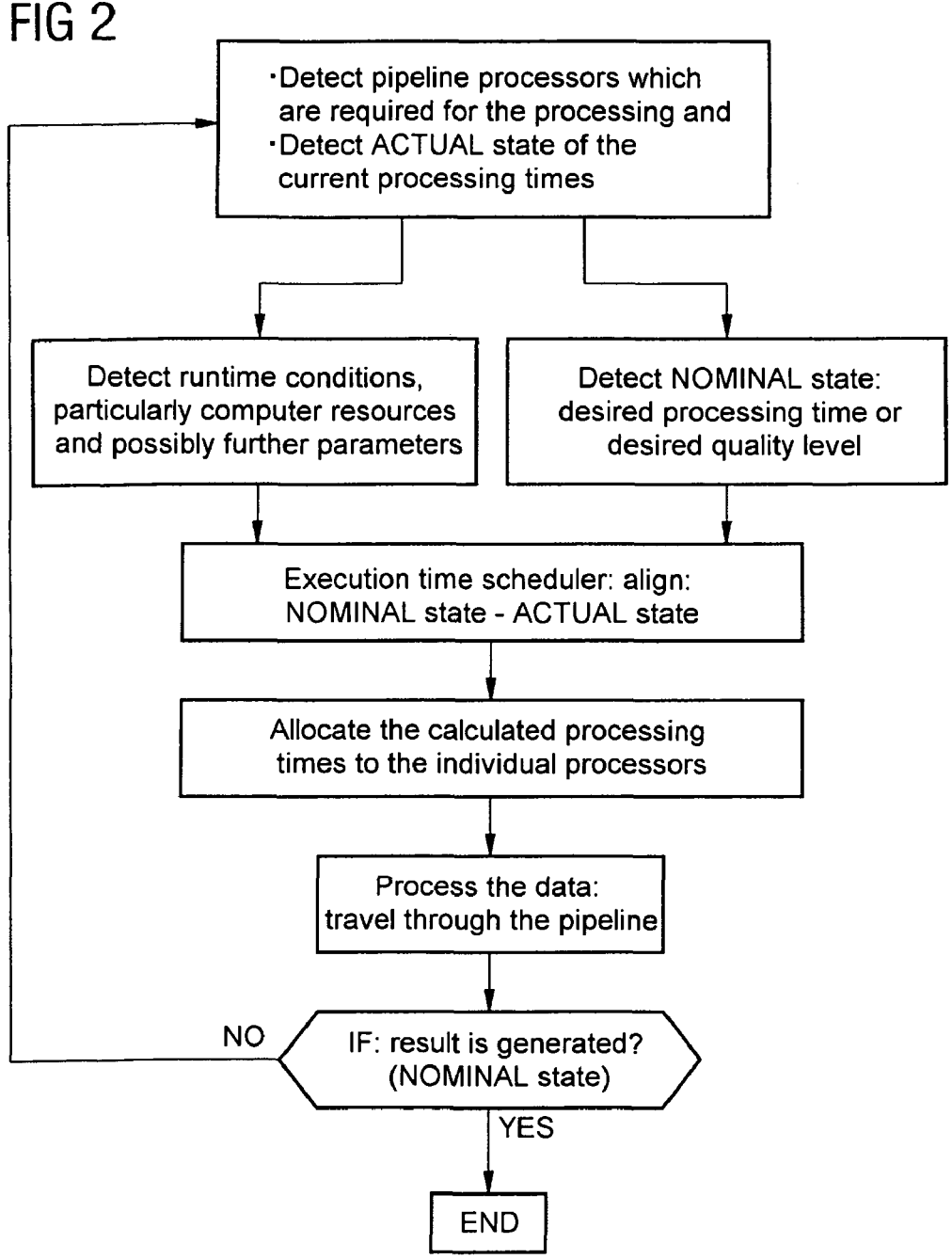

DYNAMIC CONTROL OF COMPUTER RESOURCES FOR THE PIPELINE PROCESSING OF DATA USING ANYTIME ALGORITHMS

The present application hereby claims priority under 35 U.S.C. §119 on German patent application numbers DE 10 2004 001 680.1 filed Jan. 12, 2004, the entire contents of which is hereby incorporated herein by reference.

FIELD OF THE INVENTION

The present invention generally relates to a method and/or a system for dynamically controlling, preferably for dynamically allocating, computer resources over a multiplicity of pipeline processors in a pipeline. In particular, it relates to the processing of process data using a processing pipeline to which resources can be allocated dynamically under runtime conditions and/or during the processing of the process data.

BACKGROUND OF THE INVENTION

The constraints when processing data in the medical field are frequently very different: first, there are applications which require very rapid processing of the data, such as when processing process data in the area surrounding a surgical operation, for example in the case of computer-controlled minimally invasive interventions. Secondly, there are other applications in which greater attention needs to be paid to the most comprehensive data capture possible and in which the processing time is of lesser importance, such as when analyzing data which have already been captured for a patient in connection with the drawing-up of a treatment schedule.

The result of this is that the available computer resources are accessed in quite different ways depending on the application and the purpose of use.

It follows from the instances of application outlined above by way of example that some of the processing processes are active over a relatively long period. This may result in the computer resources which are currently available fluctuating over the period of processing.

In previous systems based on the prior art, these fluctuations in the runtime conditions and/or in the computer resources were not able to be taken into account. Fixed runtime parameters, i.e. runtime parameters detected at one time, were taken as a basis. For this reason, applications were often found to be producing a deficit when changes in the system components arose during runtime, e.g. insufficient computation capacity was available for a processing process, or a processing result was generated in insufficient quality (for example an image which is displayed at much too low a resolution and is therefore unusable).

Previous solutions were based on a monolithic processing concept which permitted neither modularization of the processing processes nor flexibility toward variable system parameters.

Some real-time systems in the field of medical engineering, in particular, require the guaranteed observance of prescribed time conditions. It is thus characteristic of these systems that, by way of example, within a predefined time window a processing process needs to be completed, measurement data need to be captured and processed or particular tasks need to be initiated.

In relation to the medical data processing of image data, the present demands on the processing process may be very different overall, however. If, by way of example, images are to be processed within the context of findings analysis, then a maximum degree of accuracy for the images is crucial. The length of time that the processing process takes to display the images is of lesser importance in this case.

In contrast to this, however, data querying for images, for example, needs to involve a minimum amount of time within the context of an operative intervention. In this case, the observance of time constraints is therefore in the foreground. A system which is designed and can be used for various applications (such as a system for processing medical image data) should therefore be able to react flexibly to system conditions which change at runtime of the process and also to other conditions.

If one now also recalls that a multiplicity of processes run simultaneously, it becomes clear that the system or computer resources are subject to very great fluctuations over time.

Systems which are based on computer resources detected once and cannot respond flexibly to fluctuations regarding the computer resources are firstly susceptible to errors and secondly do not allow optimum utilization of the system resources for the current process. If the intention is to display image processing results, for example, while the available resources at runtime of the process change, then it would be desirable to match the active processing process dynamically to the altered, currently available resources without needing to interrupt the processing process.

Pipeline concepts for processing process data are known. The pipeline concept is based on sequential processing by a multiplicity of series-connected pipeline elements or pipeline processors. To allow this, the processing process needs to be structured such that it can be split into compact, smaller modules. These processing modules are then allocated individual pipeline processors. This results in the advantage that these individual modules can be more easily created, validated and matched to new demands than if one had a monolithic overall block.

The pipeline concept also entails the advantage that better load distribution in the overall system can be achieved.

The modularity of the system also allows individual modules to be combined very flexibly in another way or with other modules. Thus, the overall system can be changed without needing to create the modules per se again.

Another milieu is known to use anytime algorithms. Anytime algorithms were developed for real-time systems and have been used to date for systems in the field of artificial intelligence and robotics and are based on the approach that a processing result can be generated at any predefinable time. Depending on the scope of the time interval which is available for the processing process, the result is generated at different quality levels or grades: if the time interval is short, then the grade for the processing result is lower; if the time interval is long, then the grade for the processing result is higher.

The anytime approach allows the grade or quality of the processing result to be compared against the processing time and allows these two factors to be weighed up against one another. In anytime systems, the processing time can be determined or chosen by the user so to speak. The anytime concept requires partially redundant processing of data and in this respect is related to the parallel-processing approach.

Conversely, pipeline processing is based on a purely sequential approach.

SUMMARY OF THE INVENTION

An embodiment of the invention is based on a combination of the pipeline approach and the anytime approach.

An embodiment of the present invention therefore has an object of demonstrating a way in which the computer resources can be allocated to the processing processors dynamically at runtime without the need to interrupt the processing process.

An object may be achieved by a method for dynamically controlling general system resources for a plurality of processors, which may preferably be arranged in a pipeline, when processing process data under variable runtime conditions. In addition, an object is achieved by virtue of:

monitoring taking place at runtime, which detects an ACTUAL value for the processing time of a respective individual processor, logging of metadata for the processing of the respective processor taking place at runtime, an anytime algorithm being applied which is associated with a respective processor and which generates a result for the processing of the respective processor at an arbitrarily selectable time, particularly a time which can be chosen by the user, and by virtue of a control mechanism being applied which is intended for dynamically controlling the computer resources in respect of the processors on the basis of the ACTUAL value.

Preferably, the processors are in the form of pipeline processors, that is to say are arranged in a pipeline. However, it is also conceivable that although the processors likewise act in modular fashion their functional interaction with one another is based on a different structure.

Preferably, an object may be achieved with the inclusion of a further step, namely the detection of a NOMINAL value for an overall processing time. This NOMINAL value may be input by the user or may be ascertained automatically from other system characteristics. Once this NOMINAL value has been detected, it is also taken into account for the control mechanism in as much as the control mechanism controls, particularly allocates, computer resources over the processors on the basis of the ACTUAL value and the NOMINAL value.

An object may also achieved by a system and/or by an arrangement.

In an embodiment of the invention, the control mechanism may be activated at runtime. However, it is also possible for the control mechanism to be already active in advance or in further time slots, which may come later in time. The control mechanism is designed such that it controls the currently available computer resources even under variable runtime conditions.

In particular, it is intended to allocate the available resources to the pipeline processors. This advantageously achieves the situation in which the processing resources for the respective processing process can be scheduled during execution and hence with maximum currency. It is thus possible to react to specific demands which indirectly relate to system parameters and to achieve an optimum processing result.

In the embodiment, the method may be designed such that the monitoring takes place continuously and/or at predeterminable intervals of time. The user is thus able to select the degree of desired currency and flexibility.

Advantageously, the control mechanism accesses an execution time scheduler which allocates the computer resources to the pipeline processors dynamically at runtime and without interrupting the processing of the process data such that the NOMINAL value for the overall processing time is observed. However, it is also possible for the control mechanism itself to be designed such that it allocates the computer resources to the pipeline processors dynamically at runtime while taking into account the ACTUAL value and the NOMINAL value. In this case, the ACTUAL value needs to be made more alike the NOMINAL value.

The metadata include at least information about the processing time (timing information) of the respective pipeline processor. In this case, there may also be other processing data stored in relation to the respective processor, however, such as the quality level of the processing result, processor power, free memory space etc. These metadata are passed on from pipeline processor to pipeline processor in addition to the process data. Thus, a pipeline processor is always informed about the exact current processing status and/or about the result from the preceding processor.

The high level of variability in the inventive system can be seen in that the user is able to determine the processing time almost at will. His choice of processing time governs the quality or grade of the processing result. The overall processing time is defined by the user using the NOMINAL value. The NOMINAL value may also be altered or set for the first time at runtime. The quality level of the processing result is obtained directly from this NOMINAL value.

One important advantage of the inventive method can be seen in that the NOMINAL value for the processing time can also be set dynamically at runtime without the need to interrupt the processing of the process data. If, by way of example, image processing results are to be displayed and the demands are altered during the calculation (e.g. the available time is shortened), then image processing results can be displayed in step with this change (in relation to the example above: at a reduced quality or resolution).

The metadata are preferably captured in the pipeline processors in decentralized fashion and/or in parallel. Hence, resource allocations or other settings can be continually adjusted or altered.

The captured metadata are forwarded to the execution time scheduler and are processed thereby. The result of this control objective can then again result in redistribution of the computer resources. In the case of relatively long processing cycles, the invention has provision for an iterative process at this point.

An object may be achieved by virtue of an arrangement which includes a plurality of elements: preferably, there is a detection module, a monitoring module, a logging unit, an anytime unit, which is associated with a respective pipeline processor, and a control unit. That is to say that, in relation to the overall arrangement, a multiplicity of pipeline processors and anytime units respectively associated therewith are provided. Preferably, the logging unit is likewise of modular design and is associated with the respective pipeline processor. The control unit is preferably in the form of a central component which can interchange data with all of the pipeline processors in the pipeline and with the detection module. Alternatively, provision may be made for a pipeline processor to have not just one associated anytime unit but rather a combination of anytime units which are all based on the functionality of the respective pipeline processor.

The inventive embodiments of the method which are described above may also be in the form of a computer program product with a medium which can be read by a computer and with a computer program and associated program codes, the computer being prompted to carry out the inventive method described above when the computer program has been loaded.

An alternative way of achieving an object involves a storage medium which is intended to store the computer-implemented method described above and can be read by a computer.

BRIEF DESCRIPTION OF THE DRAWINGS

The detailed description of the figures which follows discusses exemplary embodiments which are to be understood as non-limiting together with their features and further advantages with reference to the drawings, in which:

FIG. 2 shows a flowchart relating to the execution in line with an embodiment of the invention.

DETAILED DESCRIPTION OF THE EXEMPLARY EMBODIMENTS

Figure 1:
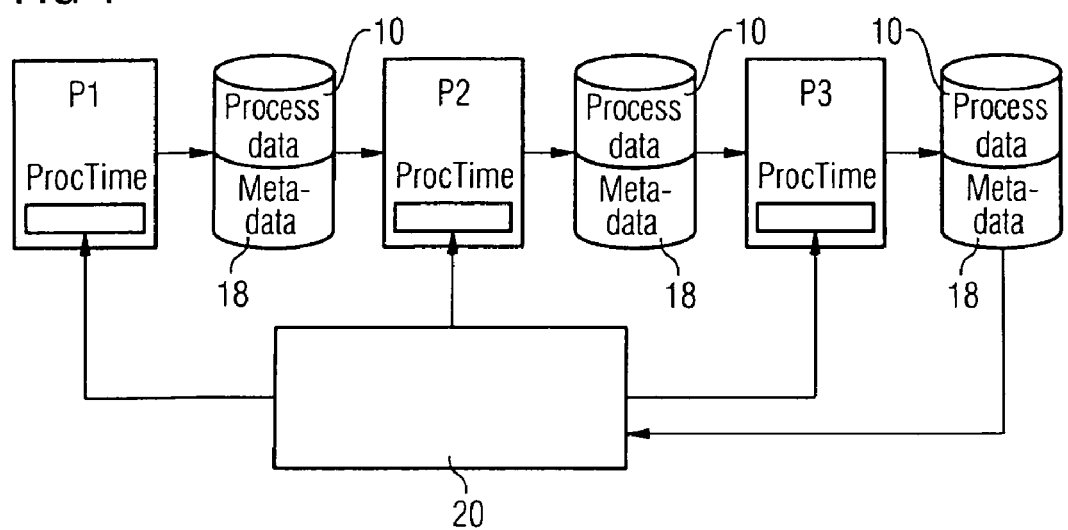
FIG. 1 shows a schematic overview of an exemplary, inventive architecture with three pipeline processors.

The text below explains the fundamental structure of the inventive system with reference to FIG. 1. For the purpose of processing process data 10, a pipeline 12 is provided which comprises a plurality of pipeline processors Pi, which are preferably connected in series, with the reference symbol Pi identifying the i-th pipeline processor. The various pipeline processors Pi are assigned different tasks on the basis of the objective (that is to say the type of processing of the process data 10).

It is an aim for a processing result to be generated following a pass through the processing pipeline 12.

Complex systems and/or complex processing objectives frequently result in fluctuations in terms of the availability of computer resources—and furthermore at runtime of the processing operation. This may result in a setting or stipulation for the resources which was made at the beginning of the processing operation being found to be inapplicable at a later time, which has an adverse effect on the processing result overall.

To be able to react to these fluctuations flexibly at runtime as well, an embodiment of the invention provides for the respective pipeline processors Pi in the pipeline 12 each to be designed with one or more anytime algorithms. The result of this is that the period of time which is required to generate the processing result for the respective pipeline processor Pi can be set variably—on the basis of a quality level or grade for the processing result. This makes it possible to distribute the resources in optimum fashion over the pipeline processors Pi at runtime too.

A detection module 16 is used to detect a NOMINAL value for the overall processing time. This NOMINAL value may be set by the user, on the basis of the current system requirements. The detection module 16 can interchange data with a control mechanism. The control mechanism is used to control the resources in respect of the pipeline processors Pi. The control mechanism comprises a central component, namely the execution time scheduler 20. The execution time scheduler 20 can interchange data with the pipeline processors Pi which are activated and required for the processing process and with the detection module 16 (not shown in the drawing).

In the example shown in FIG. 1, the pipeline 12 includes three pipeline processors P1, P2 and P3. The central element provided is the execution time scheduler 20. Each pipeline processor Pi detects its processing time (denoted as "ProcTime" in the drawing). Metadata 18 primarily include this aforementioned timing information. What is fundamental is that in addition to the process data 10 which are to be processed the metadata 18 are also forwarded from pipeline processor Pi to subsequent pipeline processor Pi+1.

Following passage through the pipeline 12, these processing times are accumulated and are processed in the execution time scheduler 20. These times relate to the current processing times and therefore define an ACTUAL value for the processing time of a respective pipeline processor Pi. The processing's NOMINAL value detected by the detection module 16 is also supplied to the execution time scheduler 20. For this reason, the execution time scheduler 20 is able to set the ACTUAL value and the NOMINAL value in relation to one another and to allocate the resources such that the ACTUAL value is adjusted to suit the NOMINAL value upon subsequent passage through the pipeline 12 or following a sequence of pipeline passes.

FIG. 2 shows a flowchart which shows the basic execution of the inventive method steps in line with the preferred embodiment.

Since a multiplicity of pipeline processors Pi are provided which—depending on the instance of application—perform different tasks, it is not always imperative to use all of the pipeline processors Pi for the respective processing. Therefore, in a first step the pipeline processors Pi which are required for the current processing process are detected.

At runtime, the respective processing times of the individual pipeline processors Pi are then detected and monitored. This monitoring also takes place at runtime.

In a further method step, which in one alternative embodiment may also be ahead in time, the runtime conditions are detected. These include parameters such as, in particular, available computer resources, type of processing desired and other parameters. The NOMINAL value is also detected, said value providing a statement about the desired overall processing time or about the quality level of the processing result.

The detected values, some of which may also be ascertained at runtime and others of which may be ascertained in advance of the actual processing, are supplied to the execution time scheduler 20. The execution time scheduler takes the values as a basis for calculating an optimum allocation of the currently available computer resources to the pipeline processors Pi. In other words, the execution time scheduler 20 calculates how much processing time a pipeline processor Pi may spend in order to allow the NOMINAL value for the overall processing process to be observed. The pipeline processors Pi are thus allocated processing times within which they have to pass on the result to the next pipeline processor Pi+1.

Possible interdependencies between the processing times of the individual pipeline processors Pi may be processed by capturing additional interdependence data. For example if it is necessary for an i-th pipeline processor Pi to know from its predecessor, the pipeline processor Pi−1, the quality level with which it has produced its result, then it possible to send this information with the metadata 18.

Following passage through the pipeline 12, a check is carried out to determine whether the result of the pipeline processing matches the NOMINAL value. If this is so, the method is terminated. Otherwise, the pipeline 12 may be passed through iteratively until the ACTUAL value matches the NOMINAL value.

However, it is also possible for the NOMINAL value to be detected only once at the start of the processing and not dynamically at runtime. Although this simplifies the method, it also results in restricted flexibility, because in that case the nominal value is firmly defined and cannot be varied dynamically.

The fundamental architecture concept in the case of the invention is based on the adjustment option for the system conditions at runtime. If, by way of example, the demands on the processing result for the process data 10 alter or if the available computer resources at runtime alter, then an embodiment of the invention allows an immediate and direct adjustment of the distribution of the processing times in the pipeline processors Pi or in the stages of the pipeline 12 without the need to interrupt the processing. By way of example, images which have already been calculated in part are calculated further on the basis of the changed, new constraints.

The use of the pipeline concept makes it possible for a plurality of tasks (e.g. display of images) to be executed in the different stages of the pipeline 12 in parallel, that is to say simultaneously. This results in a significant time saving, since calculations can be carried out in parallel to some extent. Overall, this affords the advantage of improved load distribution and exploits the positive characteristics of multiprocessor systems.

The use of an anytime approach with the architecture of the individual pipeline processors Pi allows the processing time, on the one hand, to be weighed up against the quality of the processing result, on the other. This allows much more flexible reaction to system changes, which in some cases was not at all possible with methods based on the prior art. It is also possible for the available resources to be distributed over the active processing modules, particularly over the pipeline processors Pi, in optimum fashion at any time.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable involatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable involatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of dynamically controlling computer resources of a plurality of pipeline processors in a pipeline when processing medical image data under variable runtime conditions, comprising:
  detecting a nominal value for an overall processing time, the nominal value indicating a quality level of a processing result;
  monitoring, at runtime, to detect an actual value for a processing time of a respective individual pipeline processor;
  logging metadata for the processing of the respective pipeline processor at runtime; the metadata including the processing time of the respective individual pipeline processor; the metadata being passed from one pipeline processor to the next;
  generating, using at least one anytime algorithm associated with a respective pipeline processor, a result for the processing of the respective pipeline processor at a settable time and with a settable quality level of the processing result, the at least one anytime algorithm being executed on each pipeline processor of the plurality of pipeline processors; the settable time is adjusted for each pipeline processor to correspond with the overall nominal value given the resources available to each pipeline processor; and
  using a control mechanism for dynamically controlling the computer resources of the pipeline processors on the basis of the metadata, nominal value and the actual value,
  wherein, during processing, the medical image data and the metadata are forwarded from an ith pipeline processor to an i+1th processor in the pipeline of the plurality of processors if the ith pipeline processor does not correspond with the nominal value.

2. The method as claimed in claim 1, wherein the control mechanism is also used for allocating currently available computer resources over the pipeline processors at least one of at runtime and under variable runtime conditions.

3. The method as claimed in claim 1, wherein the monitoring takes place at least one of continuously and at predeterminable intervals of time.

4. The method as claimed in claim 1, wherein the control mechanism operates by accessing an execution time scheduler which allocates the computer resources to the pipeline processors dynamically at runtime and without interrupting the processing of the process data such that the NOMINAL value for the overall processing time is observed.

5. The method as claimed in claim 1, wherein the metadata include at least information about the processing time of the respective pipeline processor.

6. The method as claimed in claim 1, wherein the NOMINAL value can be set by the user and in that a quality level for the processing result is dependent on this NOMINAL value.

7. The method as claimed in claim 1, wherein the NOMINAL value for the processing time is dynamically settable at runtime, without the need to interrupt the processing of the process data.

8. The method as claimed in claim 1, wherein the metadata are captured in the pipeline processors in at least one of decentralized fashion and in parallel.

9. The method as claimed in claim 4, wherein the metadata are forwarded to the execution time scheduler and are processed thereby.

10. A computer hardware based system that dynamically controls computer resources of a plurality of pipeline processors in a pipeline when processing medical image data under variable runtime conditions, comprising:
  a processor;
  a detection module, to detect a nominal value for an overall processing time, the nominal value indicating a quality level of a processing result;
  a monitoring module, which detects an actual value for a processing time of a respective individual pipeline processor; wherein
    logging of metadata for the processing of the respective pipeline processor occurs at runtime; the metadata including the processing time of the respective individual pipeline processor; the metadata being passed from one pipeline processor to the next;

at least one anytime algorithm is associated with a respective pipeline processor and generates a result for the processing of the respective pipeline processor at a settable time and with a settable quality level of the processing result, the at least one anytime algorithm being executed on each pipeline processor of the plurality of pipeline processors; the settable time is adjusted for each pipeline processor to correspond with the overall nominal value given the resources available to each pipeline processor; and a control mechanism for dynamically controlling the computer resources of the pipeline processors on the basis of the metadata, nominal value and the actual value, wherein, during processing, the medical image data and the metadata are forwarded from an ith pipeline processor to an i+1th processor in the pipeline of the plurality of processors if the ith pipeline processor does not correspond with the nominal value.

11. The system as claimed in claim 10, wherein the control mechanism is also for allocating currently available computer resources over the pipeline processors at at least one of runtime and under variable runtime conditions.

12. The system as claimed in claim 10, wherein the monitoring takes place at least one of continuously and at predeterminable intervals of time.

13. The system as claimed in claim 10, wherein the control mechanism operates by accessing an execution time scheduler which allocates the computer resources to the pipeline processors dynamically at runtime and without interrupting the processing of the process data such that the NOMINAL value for the overall processing time is observed.

14. The system as claimed in claim 10, wherein the metadata include at least information about the processing time of the respective pipeline processor.

15. The system as claimed in claim 10, wherein the NOMINAL value is settable by the user and wherein a quality level for the processing result is dependent on this NOMINAL value.

16. The system as claimed in claim 10, wherein the NOMINAL value for the processing time is dynamically settable at runtime, without the need to interrupt the processing of the process data.

17. The system as claimed in claim 10, wherein the metadata are captured in the pipeline processors in at least one of decentralized fashion and in parallel.

18. The system as claimed in claim 13, wherein the metadata are forwarded to the execution time scheduler and are processed thereby.

19. A computer hardware based arrangement that dynamically controls computer resources of a plurality of pipeline processors in a pipeline when processing medical image data under variable runtime conditions, comprising:

at least one processor;

at least one detection module, to detect a nominal value for an overall processing time, the nominal value indicating a quality level of a processing result;

at least one monitoring module, which detects an actual value for a processing time of a respective individual pipeline processor;

at least one logging unit, to log metadata for the processing of the respective pipeline processor at runtime; the metadata including the processing time of the respective individual pipeline processor; the metadata being passed from one pipeline processor to the next;

at least one anytime unit, designed to execute at least one anytime algorithm, associated with each pipeline processor, and which generates a result for the processing of the respective pipeline processor at a settable time and with a settable quality level of the processing result, the at least one anytime algorithm being executed on each pipeline processor of the plurality of pipeline processors; the settable time is adjusted for each pipeline processor to correspond with the overall nominal value given the resources available to each pipeline processor; and at least one control unit, for dynamically controlling the computer resources of the pipeline processors on the basis of the metadata, nominal value and the actual value, wherein, during processing, the medical image data and the metadata are forwarded from an ith pipeline processor to an i+1th processor in the pipeline of the plurality of processors if the ith pipeline processor does not correspond with the nominal value.

20. The method as claimed in claim 2, wherein the monitoring takes place at least one of continuously and at predeterminable intervals of time.

21. The method as claimed in claim 4, wherein the metadata include at least information about the processing time of the respective pipeline processor.

22. The system as claimed in claim 11, wherein the monitoring takes place at least one of continuously and at predeterminable intervals of time.

23. A computer program product comprising a non-transitory computer useable recording medium having computer readable program codes embodied in the medium that, when executed on a computer, cause the computer to carry out the method as claimed in claim 1.

24. The method as claimed in claim 1, wherein a succeeding pipeline processor in the plurality of pipeline processors is always informed about at least one of a current processing status and a result of a preceding processor in the plurality of pipeline processors.

* * * * *